US006954323B2

(12) United States Patent
Deeman et al.

(10) Patent No.: US 6,954,323 B2
(45) Date of Patent: Oct. 11, 2005

(54) COMPENSATION FOR NON-LINEARITY IN THE SERVO WRITING PROCESS BY PROGRAM PATTERN DELAY

(75) Inventors: Neil Deeman, Alamo, CA (US); Christopher Formato, Brentwood, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 225 days.

(21) Appl. No.: 10/358,487

(22) Filed: Feb. 5, 2003

(65) Prior Publication Data

US 2004/0001268 A1 Jan. 1, 2004

Related U.S. Application Data

(60) Provisional application No. 60/392,826, filed on Jun. 28, 2002.

(51) Int. Cl.[7] .................................................. G11B 5/09

(52) U.S. Cl. ............................................ 360/51; 360/75

(58) Field of Search .............................. 360/15, 16, 17, 360/77.05, 77.06

(56) References Cited

U.S. PATENT DOCUMENTS 6,204,989 B1 * 3/2001 Hrinya et al. ............ 360/77.06
6,347,016 B1 * 2/2002 Ishida et al. .................. 360/17

FOREIGN PATENT DOCUMENTS

| JP | 52130313 | 11/1977 |
|----|----------|---------|
| JP | 09138925 | 5/1997 |
| JP | 2000057718 | 2/2000 |

* cited by examiner

*Primary Examiner*—David Hudspeth
*Assistant Examiner*—Daniell L. Negrón

(57) ABSTRACT

Hard disk servo data is recorded on a stamper master or a hard disk with a timing offset that converts the arc described by the servo data writer's rotary actuator into the arc described by the disk drive's rotary actuator.

11 Claims, 5 Drawing Sheets

COMPENSATION FOR NON-LINEARITY IN THE SERVO WRITING PROCESS BY PROGRAM PATTERN DELAY

CROSS-REFERENCE TO RELATED APPLICATIONS

This application claims benefit of U.S. provisional patent application Ser. No. 60/392,826 filed on Jun. 28, 2002, which is hereby incorporated by reference.

BACKGROUND OF THE INVENTION

1. Field of the Invention

The invention relates to field of disk drives and more particularly to methods for writing servo tracks on magnetic hard disks.

2. Description of Related Art

Hard disk drives provide prerecorded tracking servo data on the data recording surfaces of their magnetic hard disks. This servo data typically comprises servo bursts spaced evenly along tracks. Data is recorded between the servo bursts. In most cases, servo bursts are approximately radially aligned, describing a small arc from the disk's ID to its OD. This radial alignment makes them look like arced spokes of the wheel. They form an arc when the servo data is written by a rotary actuator that describes an arc as it traverses between a disk's ID and its OD.

FIG. 1 illustrates a disk 10 having a number of servo data spokes 12. While there are eight illustrated in the figure, a disk drive disk will typically have hundreds of such servo data spokes spaced at even angles around disk. The number of such servo data spokes depends upon the track density. As a general rule, the greater the number of spokes, the higher the track density that can be employed in the disk drive. In many disk drives today, the servo data takes up approximately 11 percent of the total disk drive recording surface.

The servo data bursts may be written onto a disk's surface using a variety of techniques. The most common method is to write the servo onto the disk using the disk drive's own magnetic head controlled typically by an externally introduced picker that grasps the drive's rotary actuator pivot arm upon which the read/write head is mounted. An external mechanism incrementally moves the arm while other circuits command the disk drive to write the servo bursts.

Another common servo-writing method comprises writing servo bursts outside the disk drive on a so-called servo writer. In one form, the disks are already assembled onto the disk drive spindle but prior to the disk drive spindle/disk combination, also known as a hub/disk assembly ("HDA"), being assembled into the disk drive itself. In a second form, the disks are written on a separate spindle altogether and are later assembled onto the disk drive's spindle. This latter technique permits a large number of disks to be the mounted on the same servo writer. This technique reduces costs.

Another emerging technique is to imprint servo patterns on a disk using a so-called stamper. The stamper itself is mastered using a fixed e-beam directed to a turntable mounted on the end of a rotary actuator pivot arm. The turntable is rotated while arm pivots.

However, when a servo pattern is written outside the disc drive using a rotary actuator or pivot arm of some type, it introduces a problem that the actuator pivot arms of the servo writers are typically of a different length and arrangement than the actuator pivot arms of a disk drive. This causes the servo data to be written in a radial pattern or arc that is different from the arc described by the disk drive's rotary actuator pivot arm. This in turn introduces problems in a disk drive's servo system.

When the servo is written by the disk drive's own actuator, the arc that the servo data spokes describe has the same radius of curvature as the disk drive's actuator pivot arm. This is important from a drive's performance. When a drive performs a seek, it is preferred to have the servo data bursts in the next track(s) at a precisely known offset either from index or from the radial location of the servo bursts on the track from which the seek is taken. This enables for example so-called "just in time" seeking where the actuator is controlled so that it arrives in the destination track just in time to read the servo burst of the target track. If the servo burst has a timing offset, either "just in time" seeking would not be possible, or the calculations would have to include the timing offset. The latter alternative would increase the complexity of the "just in time" seeking algorithms and may require a table look up to determine the offsets, track by track. In either case, having random offsets in the servo data degrades servo performance and is undesirable.

It is therefore desirable to permit servo data to be written onto a disk drive using a servo data writer or stamper while reducing or eliminating the problems caused by the differences between the radius of curvature of a servo data writer's rotary actuators and the radius of curvature of the disk drive's rotary actuator.

SUMMARY OF THE INVENTION

Servo data is written by a servo data writer that employs a rotary actuator that has a pivot arm length different from a disk drive's rotary actuator pivot arm length. The different pivot arm lengths cause the servo data to be written in a radial arcs that have different radii of curvatures. As well, the two actuators may also have offset in their actuator pivot axes.

The invention geometrically converts the arc described by servo data writer actuator into the arc described by the disk drive's rotary actuator and writes the converted arc onto a master, a servo data stamper or the disk itself by introducing a timing offset into the servo data writer's servo writing signal.

DETAILED DESCRIPTION OF THE PREFERRED EMBODIMENTS

Figure 2:
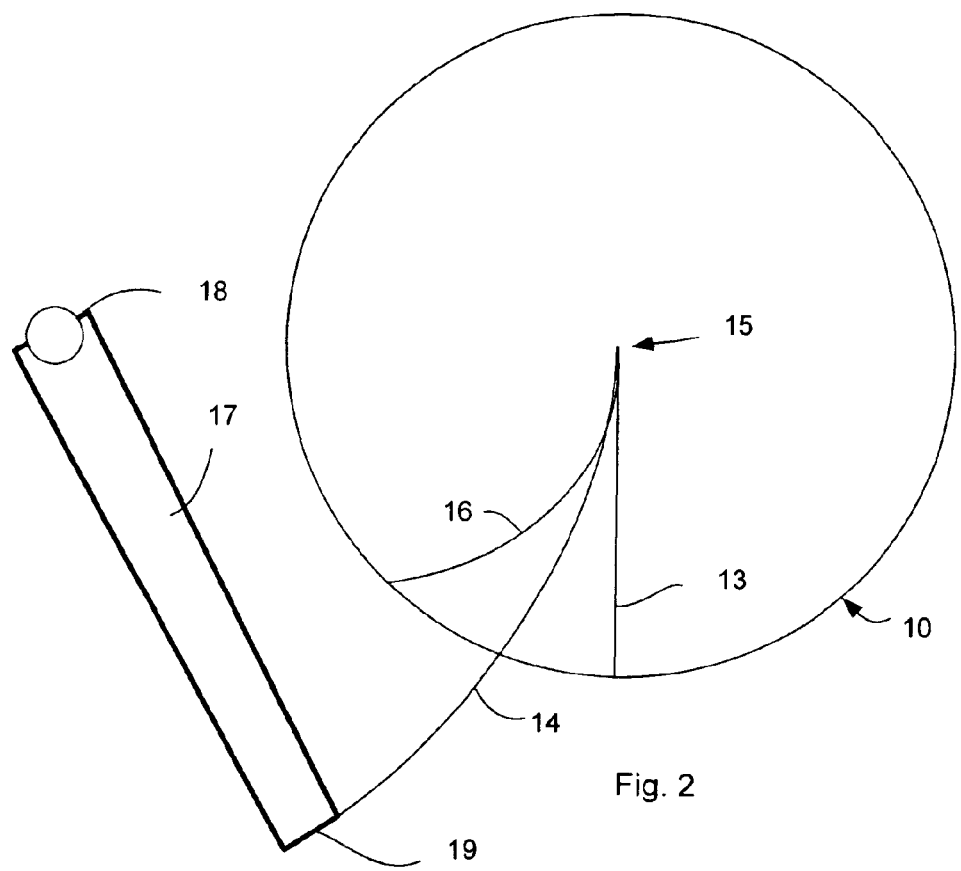
FIG. 2 is an illustration of the servo data arcs described by a linear actuator, by a servo writer actuator and by a disk drive actuator.

FIG. 2 illustrates a magnetic disk 10, a rotary actuator 17, 18 comprised of a pivot arm mounted on an axial pivot 18, the arc the pivot arm 17 traces 14 from a center 15 of the disk 10, a straight radial line 13 that extends from the center 15, and an arc 16 that has a smaller radius of curvature than arc 14 that also extends to the disk drive center 15. As it can be seen, the radius of curvature of the arc 14 depends on the length of the actuator pivot arm 17 from its pivot point 18 to its distal end 19 upon which a magnetic head typically is mounted. Thus the shorter radius of curvature arc 16 describes the path taken by a rotary actuator pivot arm (not shown for the sake of clarity) having a shorter pivot arm. As illustrated in the figure, the actuator describing the shorter radius of curvature arc 16 would also have a pivot point (not shown) offset from pivot point 18 of the longer arm 17. (If the straight radial line were actually written onto the disk 10, it would be written by a so-called linear actuator that moves radially.)

Figure 1:
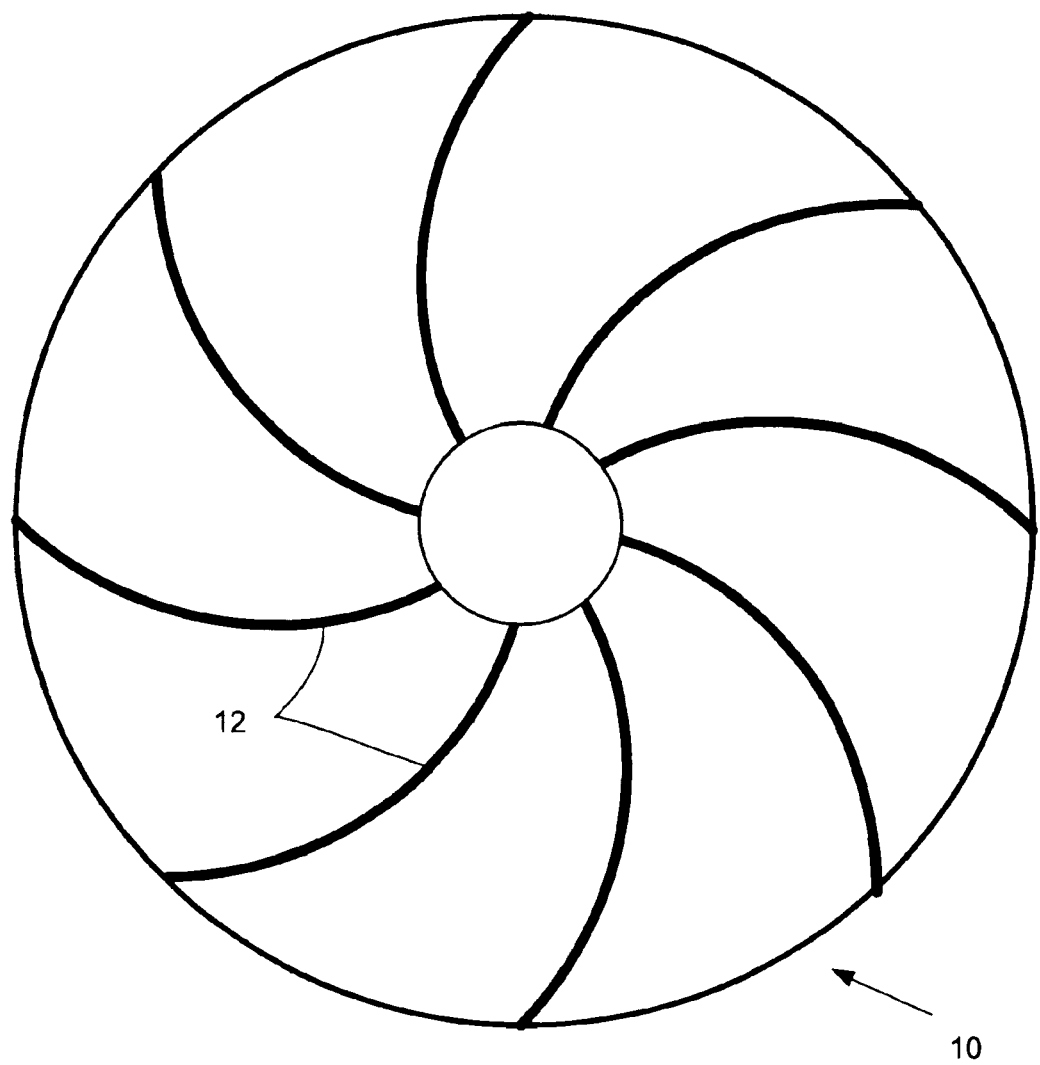
FIG. 1 is an illustration of the arced spoke patterns of servo data on a magnetic hard disk.

Assume for the moment that actuator 17, 18 is the servo writer actuator. It would write servo data according to the arc 14. In actuality it would write a large number arcs 14 evenly spaced around the disk as described above the connection FIG. 1. Let us further assume that this disk would go into a disk drive having an actuator that describes the arc 16. This would mean that the disk drive's actuator pivot arm would be much shorter than the servo writer's actuator pivot arm 17. In actual fact, disk drive arms typically have much shorter lengths than servo writer arms. They describe arcs that have smaller radii of curvature than the arcs described by the servo writer arms.

The object of the invention is to write the servo data in radial arcs 16 that correspond to the arcs described by a disk drive's actuator with a servo writer arm 17 that has a different and typically longer length and therefore a greater radius of curvature.

Figure 3:
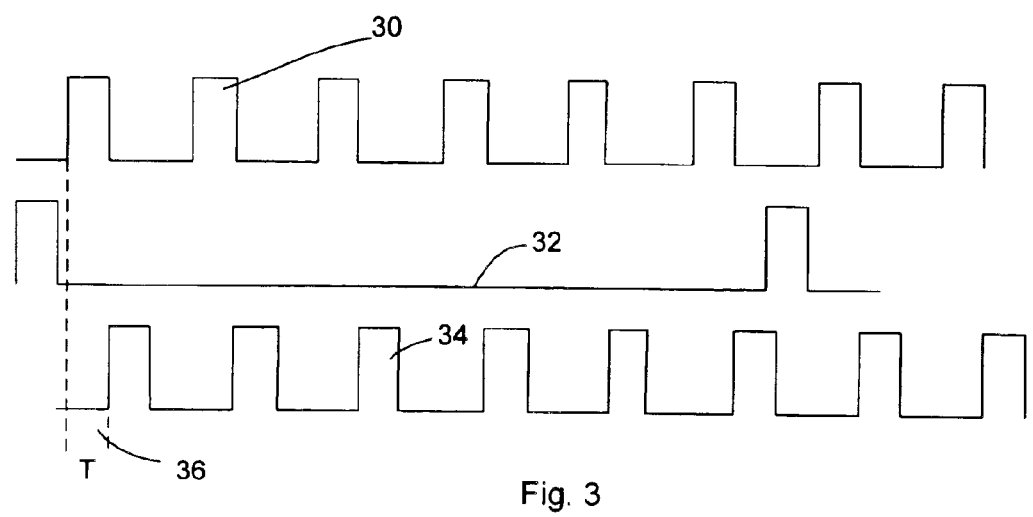
FIG. 3 is a chart of a servo data recording signal, a turntable index signal and a delayed servo data recording signal.

The general processes for doing this are illustrated in FIG. 3. The servo data writer will typically write servo bursts evenly spaced, that is evenly timed when the disk is rotated at constant speed, track by track, until the entire disk has been formatted. As the servo track writer moves from one track to another, the servo data is written with a slight physical offset, track to track, that is caused by the rotary actuator arc as described above. However the timing of the writing of the servo bursts, track to track, remains constant.

The servo writer writes servo bursts in fixed intervals from a turntable index while rotating the disk and at a constant rotational velocity. This is illustrated in FIG. 3 by turntable index 32 and the servo data recording signal 30. (Again, while there are only six timing signals 30 drawn between turntable index signals 32, a typical disk drive would have hundreds of the signals corresponding to hundreds of servo bursts for each revolution of the disk.)

At this point, the invention comprises introducing a delay T 36 that will effectively move the recording signal 30 from a location that would be on arc 14 to location that would be on arc 16. The recording signal on each track will then be the delayed by the amount T as illustrated in FIG. 3 as the delayed recording signal 34. Because the two arcs 14 and 16 have varying distances between each other depending on radius and because they could have portions of their respective arcs either ahead of or behind the other due to the arrangement of the respective actuators vis-a-vis the disk, the actual delay, or advance, T 36 is computed for each track.

The calculation of the amount of delay for each track is based upon the assumption that the two arcs have at one point of intersection. For example, in the arrangement illustrated in FIG. 2, the differences between the servo writer arc 14 and the straight radial 13 is a simple function of radius. Likewise the distance between the disk drive arc 16 and the straight radial 13 is a second simple function of radius. Thus the offset T 36 is proportional to the difference between the two respective distances from straight radial 13.

Figure 4:
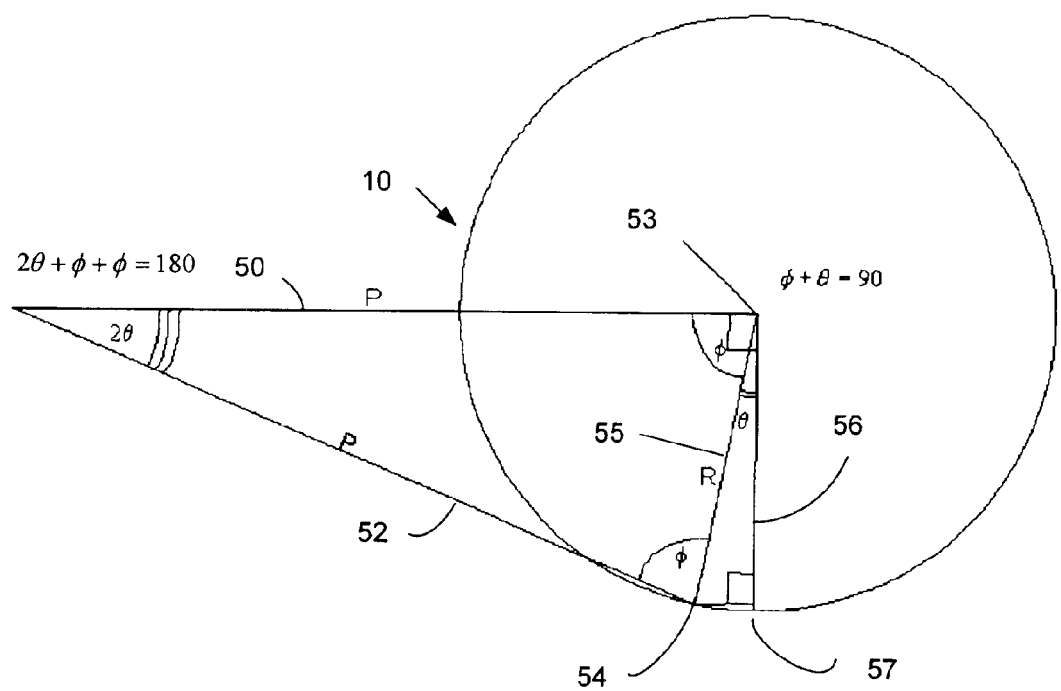
FIG. 4 is a top plan view of a servo writer showing the geometric relationships with the servo writer rotary actuator at two positions, a first at the center of the disk and a second at the circumference of the disk.

A specific example of a preferred algorithm for calculating the geometric offset between the two arcs will now be discussed, beginning in reference to FIG. 4. FIG. 4 is a top plan view of a servo writer showing the geometric relationships between the servo writer's pivot arm at two locations 50 and 52. The servo writer illustrated in the figure is of the type that writes servo patterns on a master, from which a stamper can be made. A turntable 10 is mounted at the end of the pivot arm 50. It rotates as the pivot arm moves between positions 50 and 52. A fixed e-beam device, not shown, mounted above the turntable writes the servo patterns on the stamper master (not shown) mounted on the turntable 10 as the turntable moves below the e-beam device.

FIG. 4 assumes that a servo writer pivot arm goes through the center 53 of the disk 10. "R" is a disk radius, either 55 or 56. The location the servo writer pivot arm 52 encounters the disk OD is denoted at reference 54. The location an index radius vector 56 encounters the disk OD denoted at reference 57. This index radius vector 56 corresponds to the index timing signal 32 described above. The angle subtended between the two turntable radii 55 and 56 is the angle θ is. The angle subtended between pivot arm location 50 and radius 55 is the angle ø. This is also the angle between radius 55 and the pivot arm location 52. Mathematically, ø+θ= 90°0. The angle subtended between pivot arm location 50 and pivot arm location 52 is 2θ. Using these relationships, the formula for θ at a given radius R is $$\theta_R = \frac{1}{2}\mathrm{acos}\left(1 - \frac{R^2}{2P^2}\right), \quad (1)$$

where acos stands for arccosine.

The offset "x" perpendicular to R (i.e., the distance between the index radius 56 and the radius 55) is given by $$x_R = r \sin(\theta_R).$$

The arc offset at radius R is given by $$xarc_R = R\theta_R.$$

The value $xarc_R$ is the geometric offset of the arc described by the servo data writer's actuator pivot arm 50 or 52 at radial location R and the timing index radius 56. This geometric offset may then be subtracted from or added to the offset of the disk drive actuator from the same timing index radius vector depending on whether the servo writer records the servo clockwise ("CW") or counterclockwise ("CCW").

Figure 5:
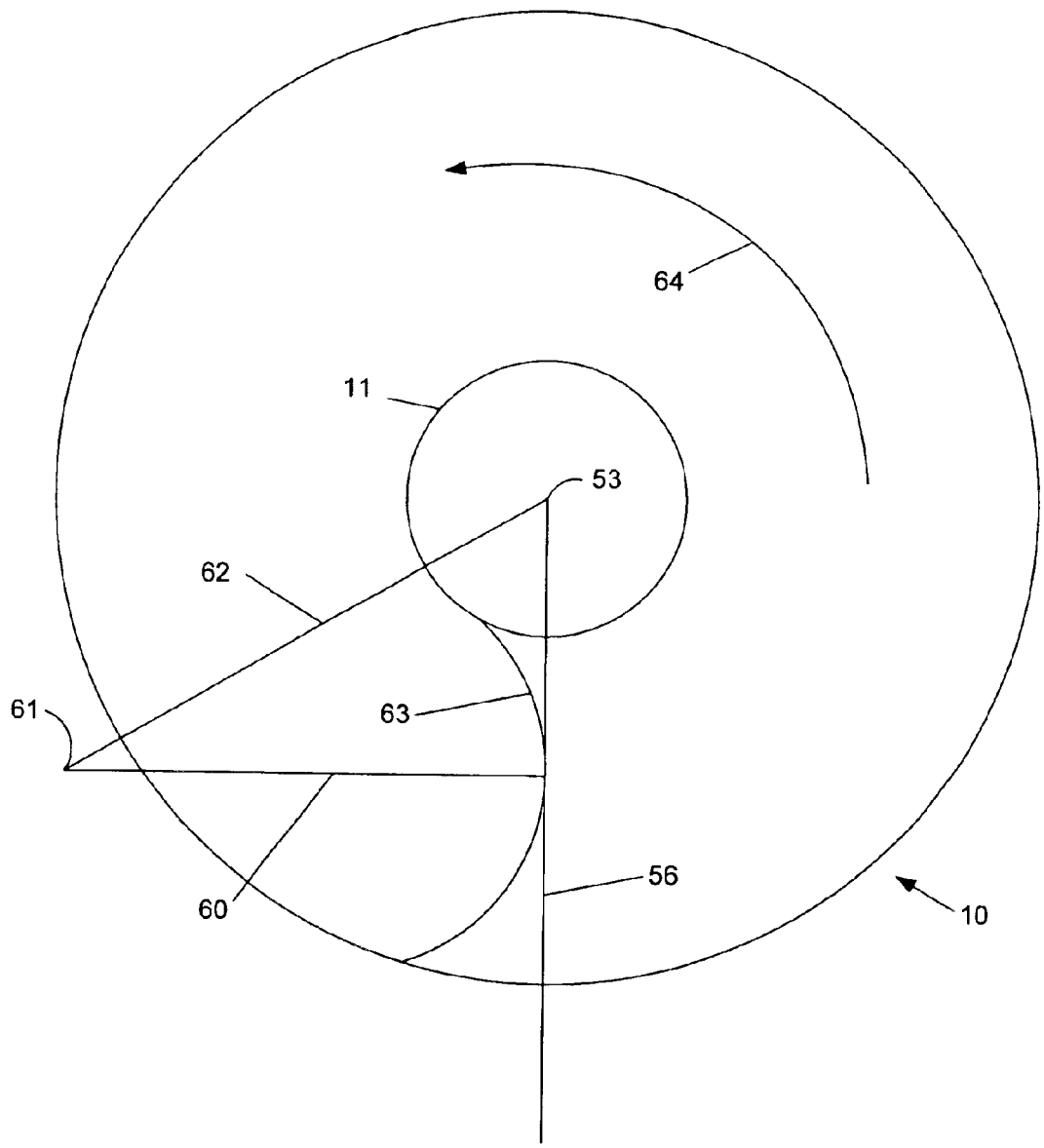
FIG. 5 is a top plan view of the disk drive showing the geometric relationships of the disk drive's actuator arm.

The disk drive actuator offset is calculated in reference to FIG. 5. In the figure, R is again a location on an index radius vector 56. Note that the index radius 56 intersects the arc 63 described by the actuator (not shown) the pivot of which is located at pivot point 61. Line 60 is a distance A between the pivot point 61 and the timing index radius vector 56. Line 62 is the distance B between the pivot point 61 and the center 53 of the disk (turntable) 10. The actuator arc delay offset between index radius vector 56 and the arc 63 described by the disk drive's actuator at a given R is given by the formula:

$$Offset_R = R\left[acos\left[\frac{\sqrt{B^2-A^2}}{B}\right] - acos\left[\frac{(R)^2+B^2-A^2}{2RB}\right]\right]$$

Depending upon the direction of rotation of the disk during servo write, the offset $xarc_R$ is either added to or subtracted from $Offset_R$ to yield geometric offsets $CW_R$ or $CCW_R$ respectively, $CW_R$ standing for clockwise rotation and $CCW_R$ standing for counterclockwise rotation. This geometric offset may then be used to determine the delay T 36 added to the servo data recording signal 30 to yield the delayed servo data recording signal 34. $CW_R$ and $CCW_R$ are calculated as follows:

$CW_R = Offset_R - xarc_R$, and $CCW_R = Offset_R + xarc_R$.

Figure 6:
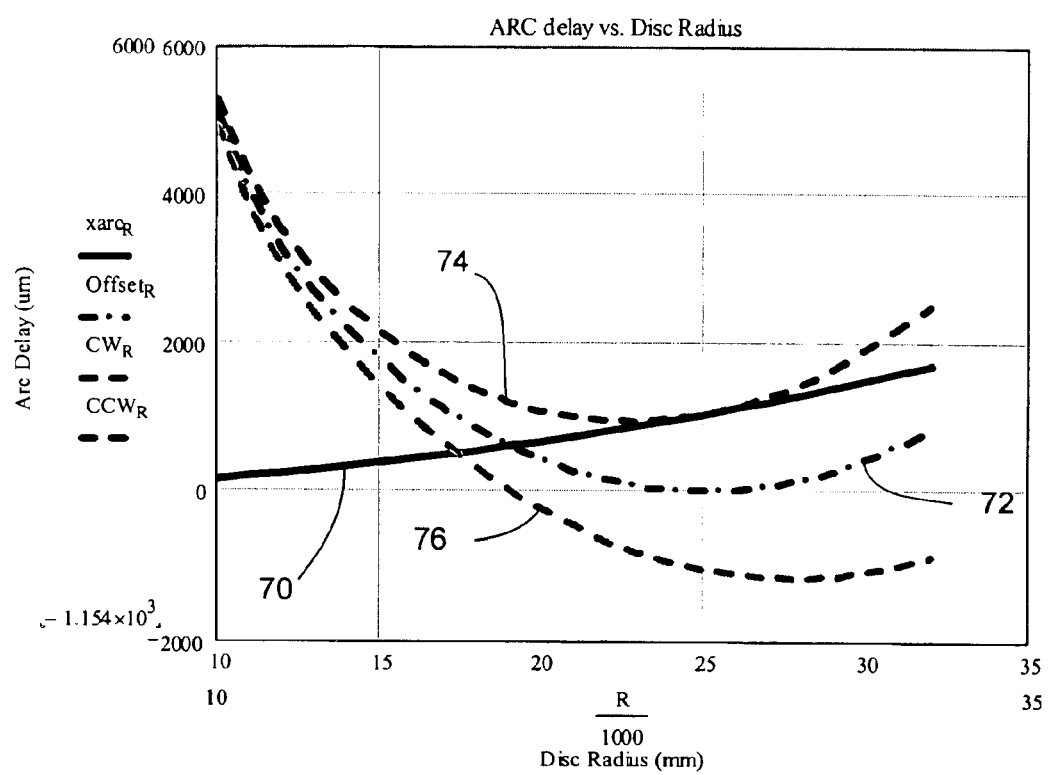
FIG. 6 is a chart showing the arc delay vs. disk radius for the servo writer, the disk drive and their combination depending upon whether the servo writer writes the servo patterns clockwise or counterclockwise.

FIG. 6 is a graph of arc delay vs. disc radius for an exemplary servo writer and disk drive combination. In the example, the spindle pivot has a length of 300,000 μm. The disc 10 has a radius from 0 to 32,000 μm. The actuator distance A and B are 29,591 and 38,735 μm respectively.

In the figure, line 70 describes the arc delay vs. radius for the spindle writer. Line 72 describes the arc delay for the disk drive actuator. Lines 74 and 76 describe the combined (actuator and servo writer) delays for CCW and CW rotation respectively.

As described above, adding either of the CCW or CW delays into the servo data recording signal operates to record a servo pattern in an arc substantially identical to the arc 63 described by the disk drive's actuator.

The description of the preferred method may be varied by those ordinary skill as appropriate and should not be taken as a limitation on the scope of the pending claims.

We claim:

1. A method of recording servo data, comprising:
    determining a geometric offset between an arc described by a rotary servo-data writer actuator and an arc described by a rotary disk drive actuator; and
    adding to a servo writing signal a timing offset according to said geometric offset, the timing offset causing the writing of servo data in the arc of a disk drive rotary actuator.

2. A method of recording servo data, comprising:
    determining a geometric offset between an arc described by a rotary servo-data writer actuator and an arc described by a rotary disk drive actuator; and
    adding to a servo writing signal a timing offset according to said geometric offset, the timing offset causing the writing of servo data in the arc of a the disk drive rotary actuator
    wherein the servo data is recorded on a master, from which a servo data stamper can be made.

3. The method according to claim 2 wherein the geometric offset is a function of radius.

4. The method according to claim 3 wherein the geometric offset is determined for each track.

5. The method according to claim 4 wherein the timing offset is the time necessary at the rotational velocity of the servo data writer to move the servo data writing location from the arc described by the servo data writer actuator to the arc described by the disk drive actuator.

6. The method of claim 1 wherein determining the geometric offset includes determining each arc's offset from a radius index.

7. A method of recording servo data, comprising:
    determining a geometric offset between an arc described by an arc described by a rotary servo-data writer actuator and an arc described by a rotary disk drive actuator, comprising:
        determining each arc's offset from a radius index; and
        either adding the offset of servo-writer actuator arc from the radius index or subtracting it from th offset of the disk drive actuator arc from the radius index, the addition or subtraction depending upon whether the servo data is written in a clockwise or a counterclockwise direction; and
    adding to a servo writing signal a timing offset according to said geometric offset, the timing offset causing the writing of servo data in the arc of a the disk drive rotary actuator.

8. A disk drive disk having one or more servo patterns written onto the disk according to claim 1.

9. A disk drive disk having one or more servo patterns written onto the disk according to claim 7.

10. A master for a servo data stamper having servo patterns recorded thereon according to the method of claim 1.

11. A master for a servo data stamper having servo patterns recorded thereon according to the method of claim 7.

* * * * *